Jan. 14, 1964     H. O. STOEVER     3,117,778
ADJUSTABLE MECHANISM FOR ACCOMMODATING SHEETS OF DIFFERENT SIZE
Filed March 26, 1962     3 Sheets-Sheet 2
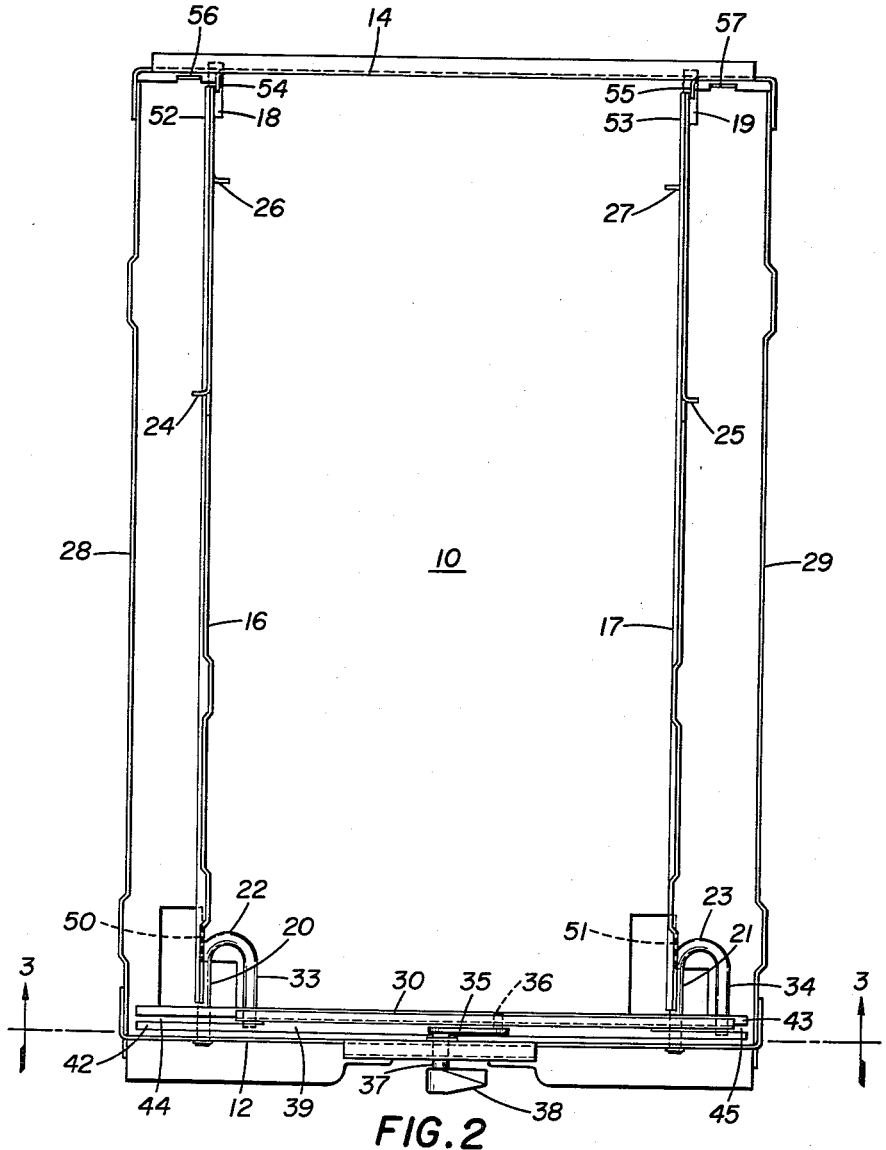
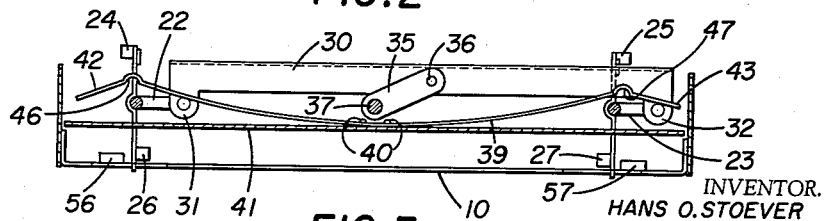
INVENTOR.
HANS O. STOEVER
ATTORNEYS Jan. 14, 1964   H. O. STOEVER   3,117,778
ADJUSTABLE MECHANISM FOR ACCOMMODATING SHEETS OF DIFFERENT SIZE
Filed March 26, 1962   3 Sheets-Sheet 3

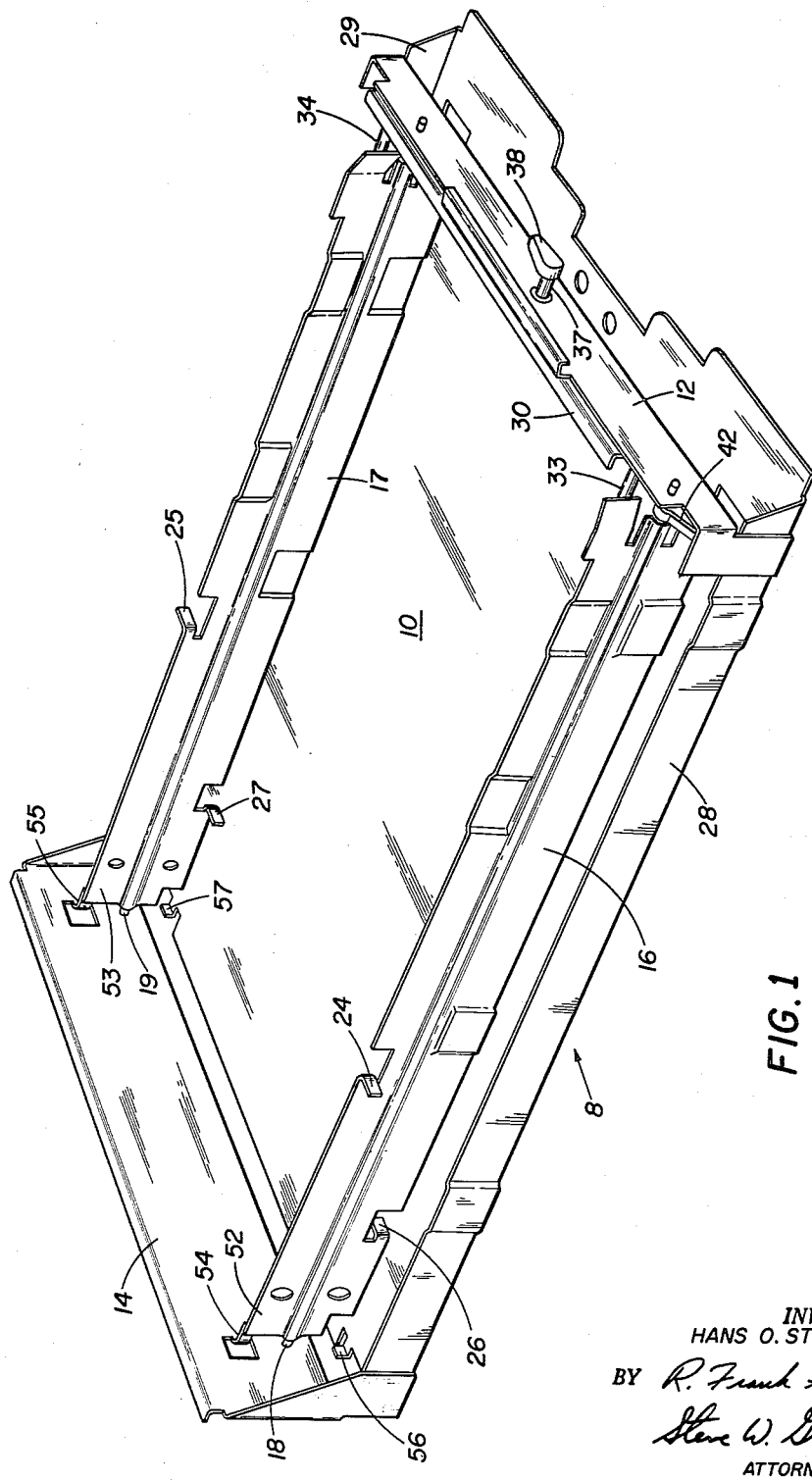

INVENTOR.
HANS O. STOEVER
BY R. Frank Smith
Steve W. Grambow
ATTORNEYS

United States Patent Office 3,117,778
Patented Jan. 14, 1964

3,117,778
ADJUSTABLE MECHANISM FOR ACCOMMODATING SHEETS OF DIFFERENT SIZE
Hans O. Stoever, Rochester, N.Y., assignor to Eastman Kodak Company, Rochester, N.Y., a corporation of New Jersey
Filed Mar. 26, 1962, Ser. No. 182,565
3 Claims. (Cl. 271—86)

This invention relates generally to stop mechanisms for sheets, and more specifically to a sheet receiving compartment having an adjustable stop mechanism for adapting compartment to receive sheets of different sizes and widths.

Copying devices of the type adapted to make two or more different size copies normally have a separate storage compartment for each size copy paper. This invention is directed to a single storage compartment for use in a copying device or the like having an adjustable stop mechanism mounted therein, and adapted in one position to provide a stop for a sheet of one length, and in another position to provide a stop for a sheet of a different length.

It is therefore one of the primary objects of the present invention to provide a storage compartment having an adjustable stop mechanism movable between a first position for stopping a sheet of one length, and a second position for stopping a sheet of a different length.

Another object of this invention is to provide an adjustable stop mechanism for copy paper and the like that is of simple design and construction, thoroughly reliable and efficient in operation, and economical to manufacture.

A further object of the invention is to provide an adjustable stop mechanism for a storage compartment movable between a first position for accommodating a paper of one length, a second position for accommodating a paper of a second length, and a third position for accommodating a paper of a third length.

A more specific object of the invention is to provide an adjustable stop mechanism mounted in a storage compartment and comprising parallel, spaced-apart, rotatable guide plates, each plate having axially spaced, transversely extending lugs, one pair of lugs forming a stop for a sheet of one length, and the other pair of lugs forming a stop for a sheet of different length upon rotation of the plates through a predetermined angle.

Objects and advantages other than those set forth above will be apparent from the following description when read in connection with the accompanying drawings, in which:

FIG. 1 is a perspective view showing a preferred embodiment of the adjustable stop mechanism of this invention in one position;

FIG. 2 is a top plan view of the mechanism of FIG. 1;

FIG. 3 is a section view taken along line 3—3 of FIG. 2;

Figure 4:
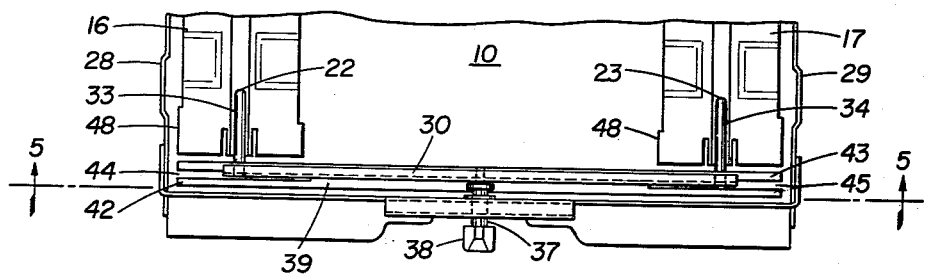
FIG. 4 is a fragmentary view similar to FIG. 2 showing the mechanism in a second position.

As shown in the drawings, a preferred embodiment of the adjustable stop mechanism of this invention is shown in connection with a storage compartment 8 having a base 10, and front and rear, parallel, upright frame members 12, 14 respectively secured thereto. The adjustable stop mechanism comprises a pair of parallel, spaced-apart rectangular guide plates 16, 17, each secured along its center line to stub shafts 18, 19 (see FIG. 2) having their ends journaled for rotation in rear frame member 14. The opposite ends of plates 16, 17 are secured along their center lines to legs 20, 21 of U-shaped rods 22, 23 which are journaled for rotation in the front frame member 12. The plates 16, 17 have struck-out lips 24, 25 along one edge extending transversely from the plate and lying in the same plane, and further adapted to co-operate with one another in one position of the plates to form stop members for a stack of sheets of a predetermined length, for example, such as letter-size copy paper having a length of 11 inches. The plates 16, 17 further have lips 26, 27 struck out therefrom and transversely extending from the plates in the opposite direction to lips 24, 25. The lips 26, 27 are axially spaced on equal distance from lips 24, 25, and co-operate upon rotation of plates 16, 17 through an angle of 180° to form stop members for a stack of sheets of a different length from said predetermined length, in this case for a legal-size copy paper having a length of 14 inches.

Figure 6:
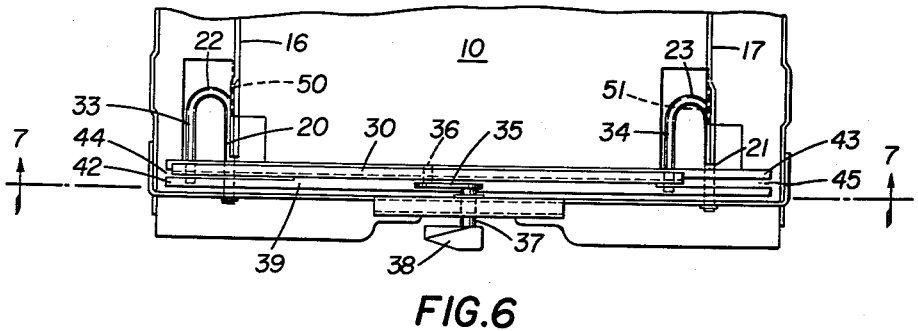
FIG. 6 is a fragmentary view similar to FIG. 4 showing the mechanism in a third position.
Figure 7:
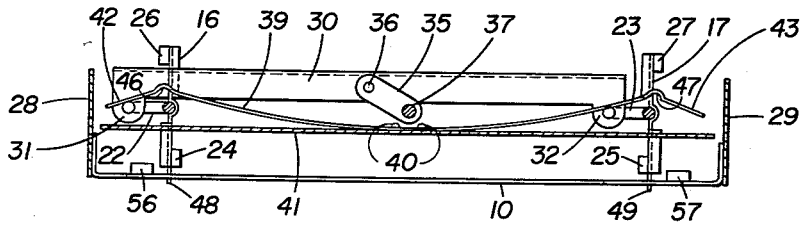
FIG. 7 is a section view taken along line 7—7 of FIG. 6.

A guide selector mechanism is provided for rotatably moving the plates 16, 17 between three different positions; a first position (see FIGS. 2 and 3) in which the plates are normal to base 10 and lips 26, 27 co-operate to form a stop for a stack of sheets of one length, a second position in which the plates are parallel to base 10 and the both sets of lips are withdrawn from the compartment 8 into an inoperative position (see FIGS. 4 and 5), and a third position (see FIGS. 6 and 7) in which the plates 16, 17 are normal to base 10 and lips 24, 25 co-operate to form a stop for a stack of sheets of different length. In the first and third positions, the plates 16, 17 form side guides for the sheets, and in the second position the sides 28, 29 of the compartment form the side guides for the sheets and the fixed lips 56, 57 form stops for the end of a stack of sheets.

The guide selector mechanism comprises a straight bar 30 whose ends 31, 32 loosely receive respective legs 33, 34 of U-shaped rods 22, 23. The bar 30 is movable by a crank 35 having a pin 36 at one end extending through an opening in bar 30, and the opposite end of crank 35 secured to a shaft 37 journaled in front member 12. A guide selector knob 38 is secured to the opposite end of shaft 37.

Figure 5:
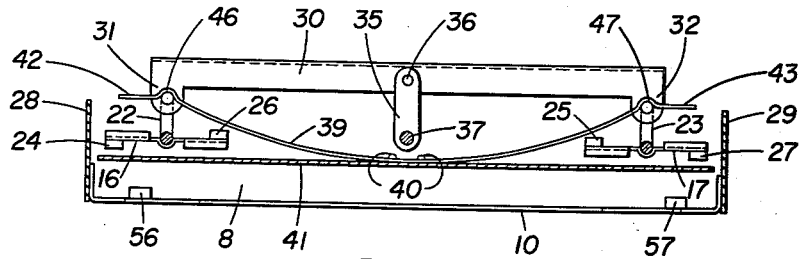
FIG. 5 is a section view taken along line 5—5 of FIG. 4.

A detent means is provided for releasably holding the plates 16, 17 in one of their three positions, and comprises a leaf spring 39 secured at its midpoint by rivets 40 or the like to the bottom flange 41 of front frame member 12. The ends 42, 43 of spring 39 bear on legs 20, 21 respectively, and have slots 44, 55 in the extreme ends through which bar ends 31, 32 extend to permit free movement of the bar ends 31, 32 relative to spring 39 as bar 30 is adjusted by selector knob 38. The spring ends 42, 43 further have bowed portions 46, 47 respectively adapted to receive corresponding legs 33, 34 for releasably holding the legs and plates in their second position as seen in FIGS. 4 and 5. In another position of plates 16, 17, the spring ends 42, 43 urge legs 33, 34 respectively in a counterclockwise direction (see FIGS. 6 and 7) causing lugs 48, 49 on the edge of the plates 16, 17 to strike stop shoulders 50, 51 formed on base 10. In still another position of the plates 16, 17, the legs 33, 34 are urged in a clockwise direction (see FIG. 3) causing the corners 52, 53 of the plates to strike lugs 54, 55 struck out from rear frame member 14.

In the operation of this device, with the selector knob in the position shown in FIGS. 2 and 3, the corners 52, 53 of the plates are urged by spring 39 into engagement with stop lugs 54, 55 holding guide plates 16, 17 in a position normal to base 10 to form side guide members for a stack of sheets. Furthermore, in this position, the lips 26, 27 overlie base 10 and co-operate to form a stop for a stack of sheets of a predetermined length inserted into storage compartment 8. To adjust the mechanism to provide a stop for a stack of sheets of a different length, the operator may move selected knob 38 through an angle of 180° to the position shown in FIGS. 6 and 7 with lugs 48, 49 on plates 16, 17 engaging stop shoulders 50, 51. In this position, the plates 16, 17 have been turned through an angle of 180°, and now lips 24, 25 overlie base 10 to form a stop member for a stack of sheets of different length. The position of knob 38 intermediate the other two positions as seen in FIGS. 4 and 5 moves plates 16, 17 parallel to base 10, withdrawing the lips 24, 25, 26 and 27 out of the path of the sheets in the compartment. The compartment 8 may then accommodate a sheet of large width, bounded on the sides by the sides 28, 29 of the compartment, and greater length, determined by fixed stops 56, 57 on base 10.

Although applicant's adjustable stop mechanism provides two stop positions for sheets of two different lengths, the third length of sheets being accommodated by the compartment when the stop mechanism is in its inoperative position, the mechanism could be readily modified by incorporating another plate on each shaft angularly spaced 90° from the present plate. The added plates could then have lips struck out therefrom axially spaced from the present lips to form stop members for papers of still different lengths. Any suitable detent means could be provided for the bar to limit rotation of the selector knob through angles of 90°. In such a modification, the fixed stop members 56, 57 may not be needed. Also, it is obvious that the adjustable stop mechanism could function adequately with only one rotatable plate rather than two, although applicant prefers the two, parallel, spaced-apart plates for more positive stopping action.

The invention has been described in detail with particular reference to a preferred embodiment thereof, but it will be understood that variation and modifications can be effected within the spirit and scope of the invention as described hereinabove and as defined in the appended claims.

I claim:

1. In an adjustable stop mechanism for a storage compartment having a base and spaced side walls, the combination comprising:

(A) a first rotatable plate extending longitudinally of and supported by opposite walls of said compartment and having sheet stops projecting transversely from opposite faces thereof and spaced axially therealong, and (B) means for selectively rotating said first plate between (1) a first position in which said plate is normal to the base of said compartment to form a guide for one side edge of said sheets and one of said sheet stops forms an end stop for sheets of a predetermined length, (2) a second position in which said plate is normal to the base of said compartment to form a guide for one side edge of said sheets and another of said sheet stops forms an end stop for sheets of a different length, and (3) a third position in which said plate is substantially parallel to the base of said compartment and said sheet stops are moved out of the path of sheets fed into said compartment.

2. The invention according to claim 1 and further including a second rotatable plate identical to said first plate and supported by said compartment in substantially parallel relation to said first plate and spaced apart therefrom by an amount equal to the width of sheets to be accommodated by said compartment, said plates co-operating to form guides for opposite side edges of sheets of a given width in said first and second positions, said second plate further adapted to be actuated by said moving means along with said first plate into portions corresponding to said first, second, and third positions.

3. The invention according to claim 2 and further including a detent means for releasably holding said first and second plates in one of said first, second and third positions.

References Cited in the file of this patent

UNITED STATES PATENTS

| | | |
|---|---|---|
| 305,122 | Walkup | Sept. 16, 1884 |
| 2,406,040 | Ryan et al. | Aug. 20, 1946 |
| 2,672,079 | Chandler | Mar. 16, 1954 |